(12) United States Patent
Johst et al.

(10) Patent No.: US 10,974,397 B2
(45) Date of Patent: Apr. 13, 2021

(54) ROBOT WITH POSITIONING MEANS TO MOVE A TOOL ALONG A FLANGE CONNECTION

(71) Applicant: ADMEDE AB, Malmö (MA)

(72) Inventors: Kenneth Johst, Frederiksberg C (DK); Lars Jagd, Malmö (SE); Gerald Marinitsch, Kalsdorf (AT)

(73) Assignee: ADMEDE AB, Malmö (SE)

( * ) Notice: Subject to any disclaimer, the term of this patent is extended or adjusted under 35 U.S.C. 154(b) by 252 days.

(21) Appl. No.: 16/071,864

(22) PCT Filed: Jan. 19, 2017

(86) PCT No.: PCT/EP2017/051084
§ 371 (c)(1),
(2) Date: Jul. 20, 2018

(87) PCT Pub. No.: WO2017/125494
PCT Pub. Date: Jul. 27, 2017

(65) Prior Publication Data
US 2019/0022873 A1 Jan. 24, 2019

(30) Foreign Application Priority Data
Jan. 21, 2016 (EP) .................................. 16152186

(51) Int. Cl.
*B25J 15/00* (2006.01)
*B23P 19/06* (2006.01)
(Continued)

(52) U.S. Cl.
CPC ......... *B25J 15/0019* (2013.01); *B23P 19/067* (2013.01); *B25J 11/005* (2013.01); *B25B 23/08* (2013.01); *Y02B 10/30* (2013.01)

(58) Field of Classification Search
CPC .... B25J 15/0019; B25J 11/005; B23P 19/067; B25B 23/08; Y02B 10/30
(Continued)

(56) References Cited

U.S. PATENT DOCUMENTS 4,879,927 A * 11/1989 Sevelinge ............... B23P 19/06
                                                    81/56
8,016,534 B2 * 9/2011 Nilsen .................... F16B 39/025
                                                   411/217
(Continued)

FOREIGN PATENT DOCUMENTS

| EP | 2 671 673 | 12/2013 |
| EP | 2 607 685 | 3/2014 |
| WO | WO 2015/152728 | 10/2015 |

OTHER PUBLICATIONS

PCT/EP2017/051084, Apr. 24, 2017, International Search Report and Written Opinion.

*Primary Examiner* — Hadi Shakeri
(74) *Attorney, Agent, or Firm* — Workman Nydegger

(57) ABSTRACT

Robot (1) to tighten a series of nuts (2) pre-screwed on bolts (3) arranged in a curved flange connection (4), which bolts (3) project from the nuts (2) pre-screwed in substantially a nut plane (13) by a projection length (15), which robot (1) comprises a drive to move the robot (1) along the curved flange connection (4) and a tool (10) to tighten the nuts (2) with a predefined torque both connected to a support platform (6), characterized in that
the tool (10) is built to screw a tension nut (26) onto the bolt (3) to elongate the bolt (3) and to tighten the pre-screwed nut (2) with a predefined torque with a tightening wheel (35), which robot (1) comprises positioning means to substantially align the axis (28) of the tension nut (26) with the axis (Continued)

(14) of the bolt (3) by lowering the tool (10) onto the bolt (3) in order to screw the tension nut (26) onto the bolt (3).

9 Claims, 6 Drawing Sheets

(51) Int. Cl.
*B25J 11/00* (2006.01)
*B25B 23/08* (2006.01)

(58) Field of Classification Search
USPC .............................................. 81/57.38, 57.39
See application file for complete search history.

(56) References Cited

U.S. PATENT DOCUMENTS

| | | | |
|---|---|---|---|
| 10,173,309 B2* | 1/2019 | Jaeger | B25B 29/02 |
| 2013/0205575 A1* | 8/2013 | Imi | G21C 19/20 |
| | | | 29/525.02 |
| 2019/0030665 A1* | 1/2019 | Johst | B23P 19/067 |

* cited by examiner

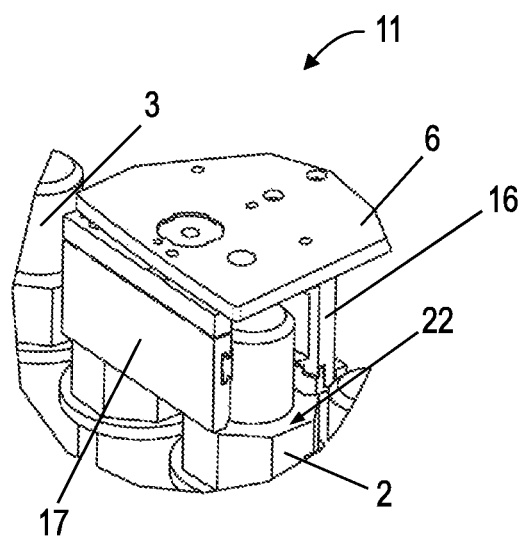
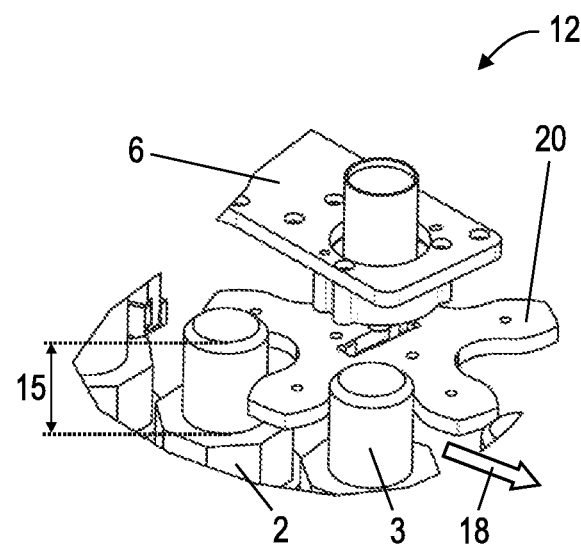
FIG. 3A
FIG. 3B
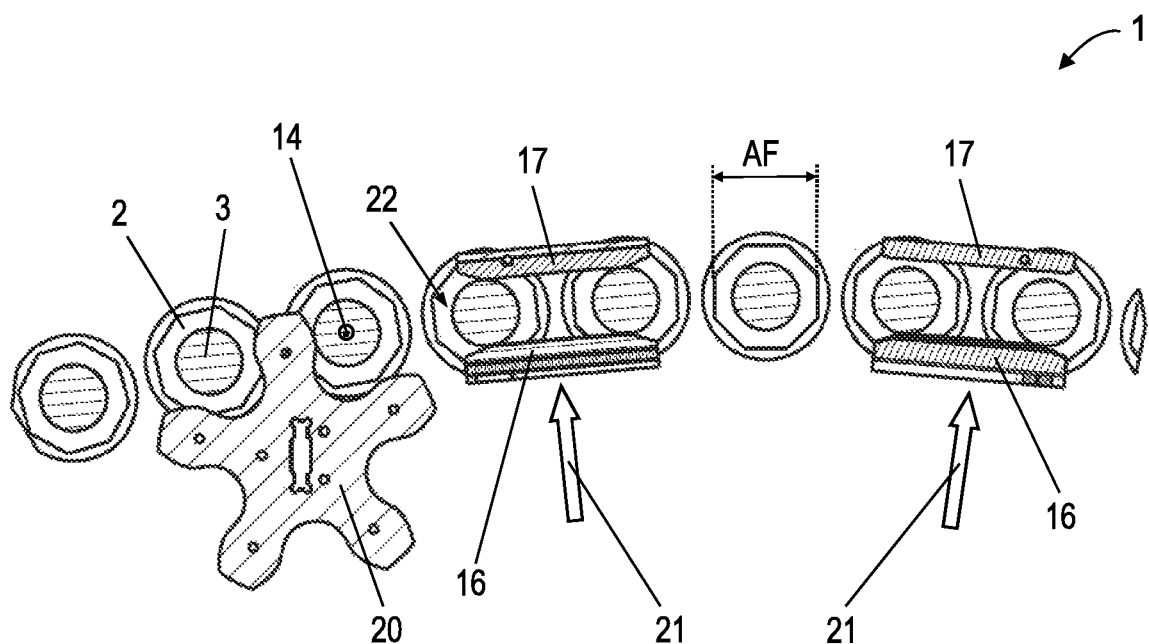
FIG. 4

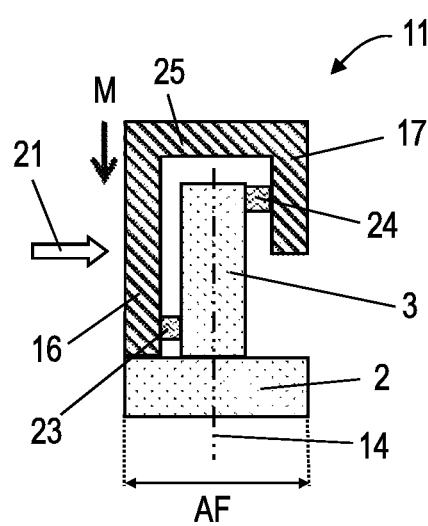
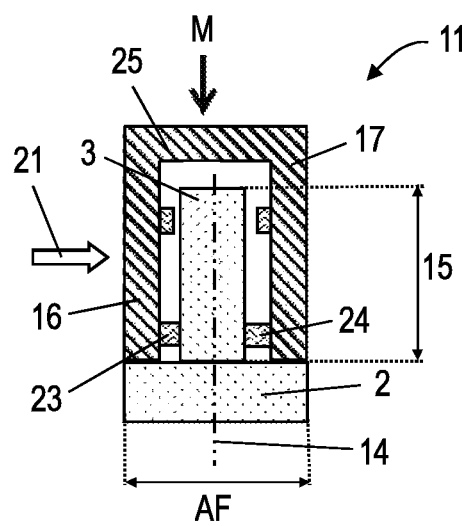
FIG. 5A  FIG. 5B
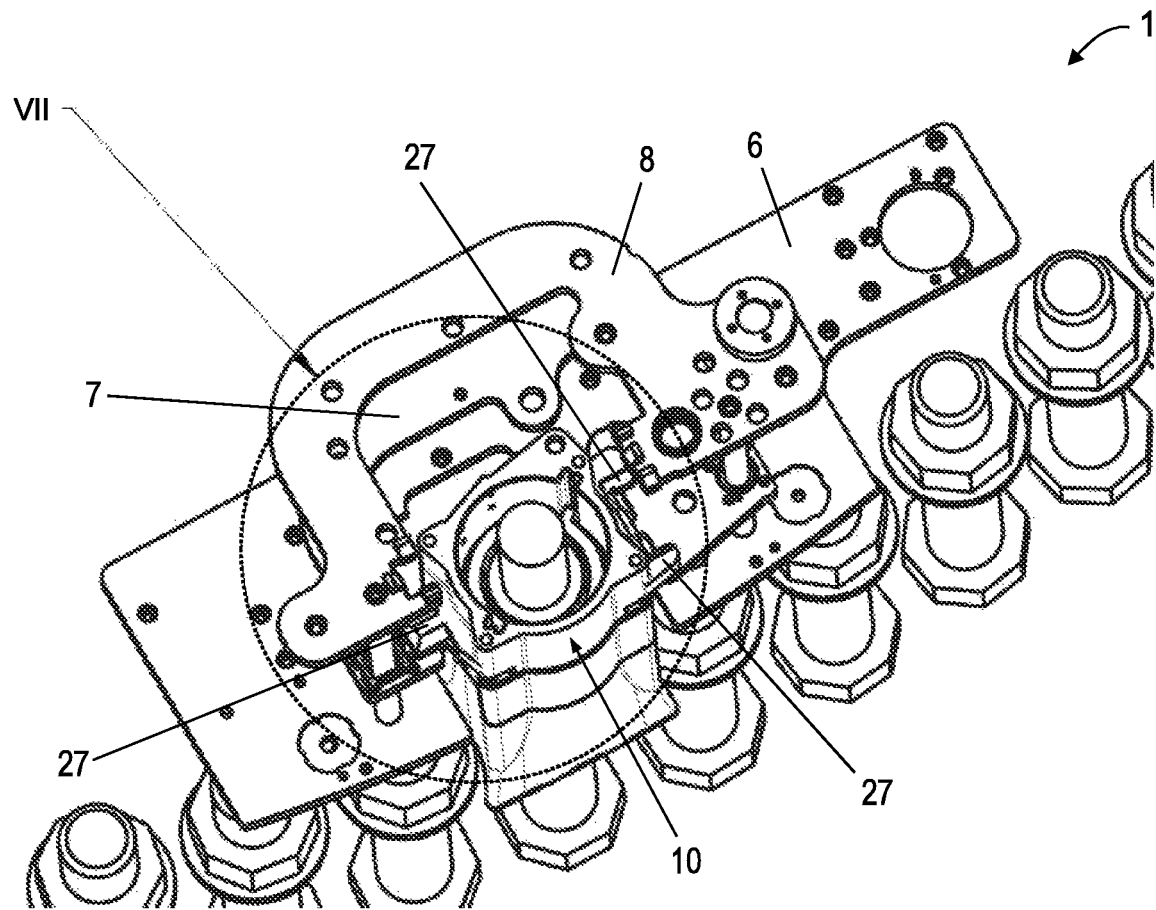
FIG. 6

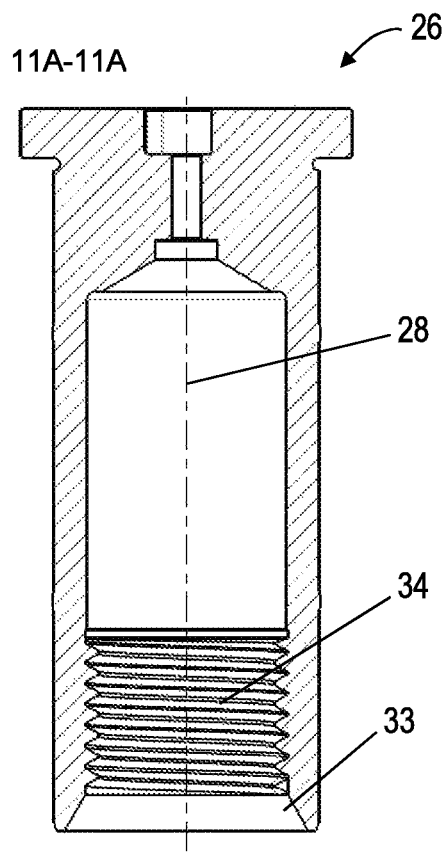
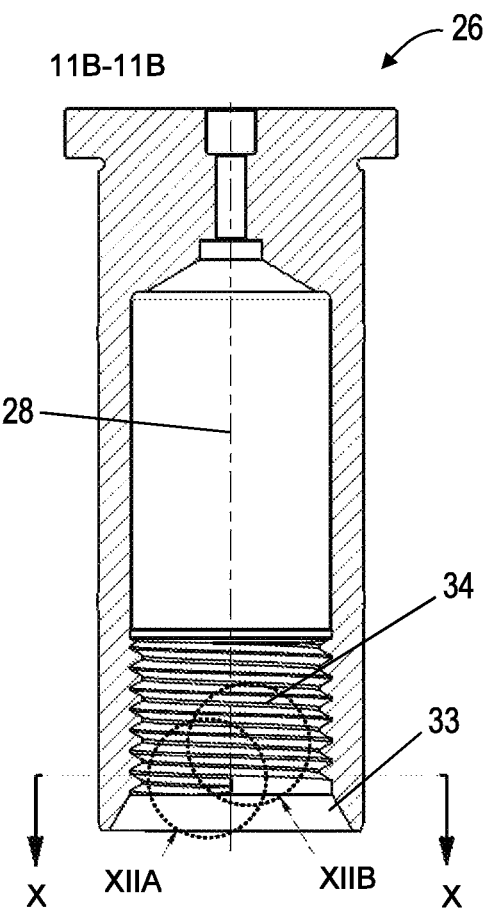
FIG. 11A  FIG. 11B
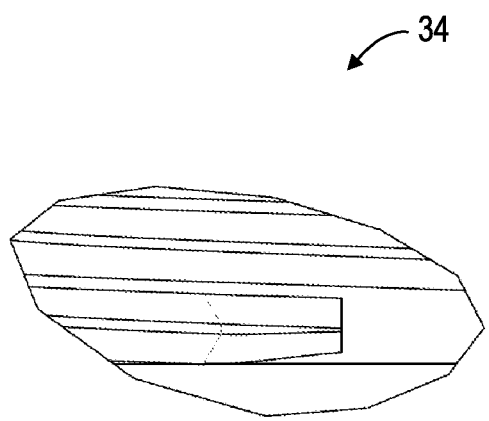
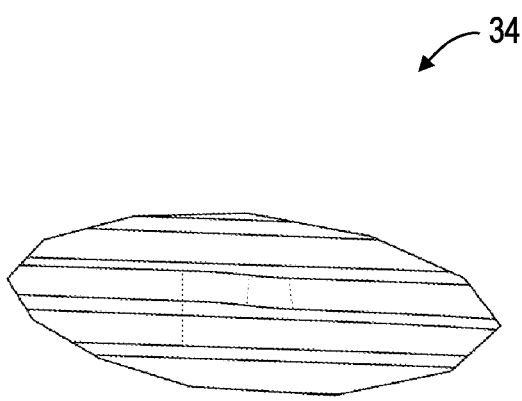
FIG. 12A  FIG. 12B

ROBOT WITH POSITIONING MEANS TO MOVE A TOOL ALONG A FLANGE CONNECTION

CROSS REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION

The present invention is related to a robot to tighten a series of nuts pre-screwed on bolts arranged in a linear or in a particular curved flange connection, which bolts project from the nuts pre-screwed in substantially a nut plane by a projection length, which robot comprises a drive to move the robot along the curved flange connection and a tool to tighten the nuts with a predefined torque both connected to a support platform.

The present invention is furthermore related to a method to tighten a series of nuts pre-screwed on bolts arranged in a linear or in a particular curved flange connection with a robot, which bolts project from the nuts pre-screwed in substantially a nut plane by a projection length and which robot comprises a drive to move the robot along the curved flange connection and a tool to tighten the nuts with a predefined torque both connected to a support platform.

Field of the Invention

During the erection of buildings, machines, facilities, plants or similar structures large amounts of bolt connections, especially such ones arranged in curved flange connections involving large quantities of bolts of large size, need to be tightened. Often this has to be done in places difficult or dangerous to access, as for example during the erection of wind turbines, oil platforms, pipelines, etc. In addition, a high level of quality is needed in order to ensure the stiffness and strength of such connections.

Today, in such bolt connections the pre-screwed nuts are typically tightened on the bolts manually. Hereby, this procedure applies a specified preload, usually a predefined torque, to the pre-screwed nuts. In general, two different methods are used to tighten the nuts with such a predefined torque: In the bolt stretching method, tension is applied to the bolt by stretching the bolt by a physical elongation and tightening the nut with a predefined torque; in the torque wrench method, tension is applied to the bolt by applying the predefined torque to the nut with a torque wrench. The bolt stretching method is regarded to provide a higher quality and is therefore preferred. Nevertheless, in order to obtain a physical elongation of the bolt in a pre-screwed flange connection, the bolt needs to be clamped or fixed at its threaded portion and pulled away from the flange such that the nut can be tightened. Since the engagement of a tool with the threaded portion of the bolt demands very high accuracy and caution, the tightening procedure is done manually. Hence, such manual tightening processes are very risky, time-consuming, expensive, and moreover, difficult to be automated.

Description of Related Art Including Information Disclosed Under 37 CFR 1:97 and 1:98

EP 2 607 685 B1 discloses a robot to bolt down a series of nut bolts in a joint circular flange connection of a wind turbine. The robot can carry a tool to bolt down nut bolts with a predefined torque and a position sensor to position the tool above the nut bolt to be bolted down.

BRIEF SUMMARY OF THE INVENTION

This known robot has the disadvantage that it is not able to automatically align a tool with the bolts in such a precise way that it may perform the bolt stretching method in order to tighten nuts pre-screwed on bolts arranged in a curved flange connection.

It is an objective of the presented invention to provide a robot to automatically align a tool, which is able to elongate a bolt and tighten a pre-screwed nut, with the bolt in such a precise way that it avoids the drawback of the known robot.

This objective is achieved with a tool that is built to screw a tension nut onto the bolt and to elongate the bolt and to tighten the pre-screwed nut with a predefined torque with a tightening wheel, and with a robot that comprises positioning means to substantially align the axis of the tension nut with the axis of the bolt to screw the tension nut onto the bolt.

It is furthermore an objective of the presented invention to provide a method to automatically align such a tool, which is able to elongate a bolt and tighten a pre-screwed nut, with the bolt in such a precise way that it avoids the drawback of the known robot.

This objective is achieved with a method that comprises the following steps:
  Position the tool in a way to substantially align the axis of a tension nut of the tool with the axis of the bolt;
  Screw the tension nut onto the bolt;
  Elongate the bolt;
  Tighten the nut with the predefined torque with a tightening wheel of the tool.

The robot according to the invention comprises the advantage that the tool is pin-ended by connection means on a movable mounting platform supported by the support platform and movable substantially along the axis of the tension nut. Since the connection means comprise at least one rounded element to enable tipping of the tool, the axis of the tension nut can be aligned with the axis of the bolt very precisely and smoothly. Thus, the tool can be lowered onto the bolt in a well-controlled and fully automated way.

In an advantageous embodiment the first turn of the thread of the tension nut is formed to ease the insertion of the thread of the bolt. In this context, the first turn of the thread of the tension nut compared with a standard metric thread comprises a larger chamfer with a steep angle to ease the insertion of the thread of the bolt. In addition, at least the first turn of the thread of the tension nut compared with a standard metric thread may comprise a reduced cross section by a parallel offset of one of the walls of the thread to create more clearance. Thus, when lowering the tool onto the bolt, the thread of the bolt can be inserted into the tension nut more easily and with reduced risk of thread damage.

These and further advantageous embodiments of the invention will be explained based on the following description and the accompanying drawings. The person skilled in the art will understand that various embodiments may be combined.

BRIEF DESCRIPTION OF THE SEVERAL VIEWS OF THE DRAWINGS

FIG. 3A shows detail IIIA of FIG. 2.

FIG. 3B shows detail IIIB of FIG. 2.

FIG. 4 shows in a top view a section parallel to the nut plane of FIG. 2.

FIG. 5A shows in a cross section parallel to a bolt axis an inversely U-shaped guiding bracket in a first embodiment.

FIG. 5B shows in a cross section parallel to a bolt axis an inversely U-shaped guiding bracket in a second embodiment.

FIG. 6 shows in a perspective view the robot according to a third embodiment of the invention.

FIG. 11A shows in a longitudinal section along 11A-11A the tension nut of FIG. 10.

FIG. 11B shows in a longitudinal section along 11B-11B the tension nut of FIG. 10.

FIG. 12A shows detail XIIA of FIG. 11B.

FIG. 12B shows detail XIIB of FIG. 11B.

DETAILED DESCRIPTION OF THE INVENTION

Figure 1:
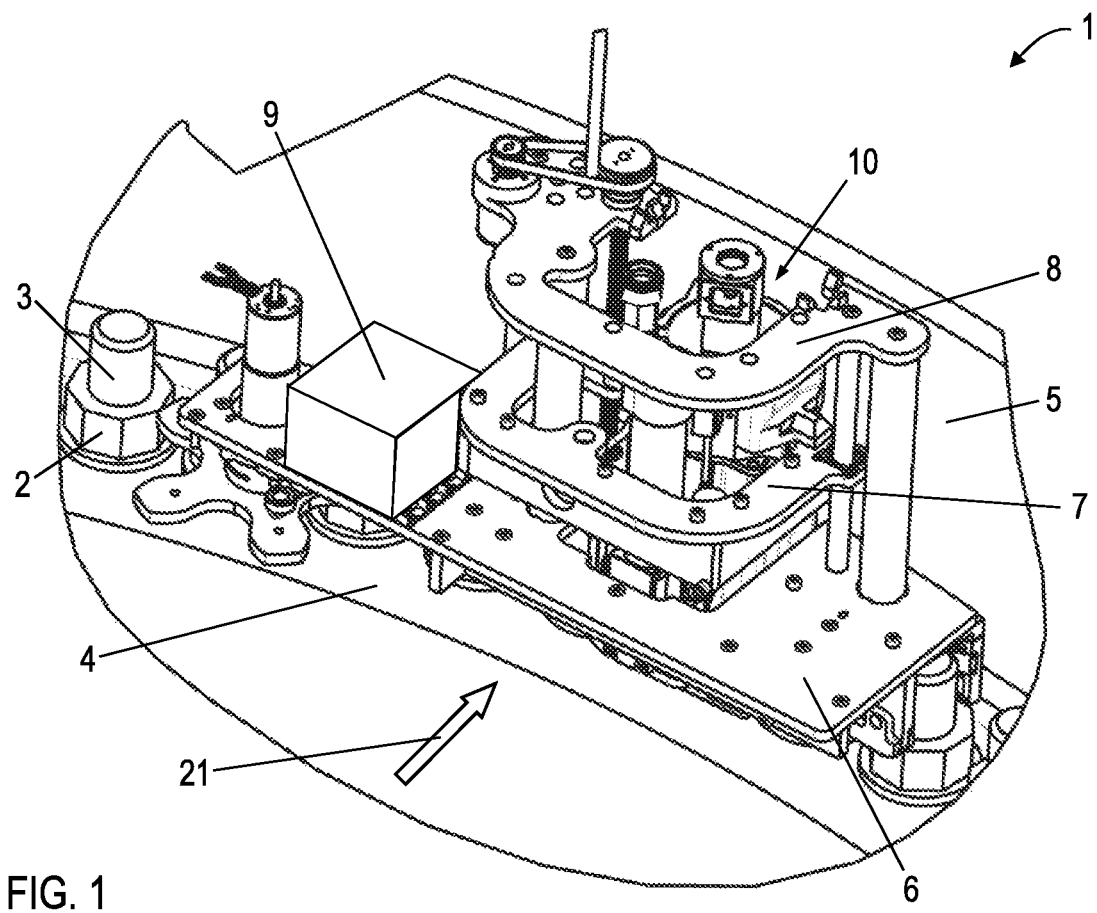
FIG. 1 shows in a perspective view a robot according to a first embodiment of the invention.

FIG. 1 shows a robot 1 according to a first embodiment of the invention. In this embodiment the robot 1 is used to tighten nuts 2 pre-screwed on bolts 3 arranged in a curved flange connection 4. The curved flange connection 4 is situated closely next to a wall 5. This wall 5 could for example be a wall of a tube segment of a wind turbine tower. The robot 1 comprises a support platform 6, a drive to move the robot 1 along the curved flange connection 4, a movable mounting platform 7, a top plate 8, whereas the movable mounting platform 7 and the top plate 8 are supported by the support platform 6. The robot 1 furthermore comprises a robot control system 9 to control the tightening procedure and to store and document parameters, and a tool 10 to stretch each bolt 3 with a predefined force and subsequently tighten the corresponding nut 2 with a predefined torque.

Figure 2:
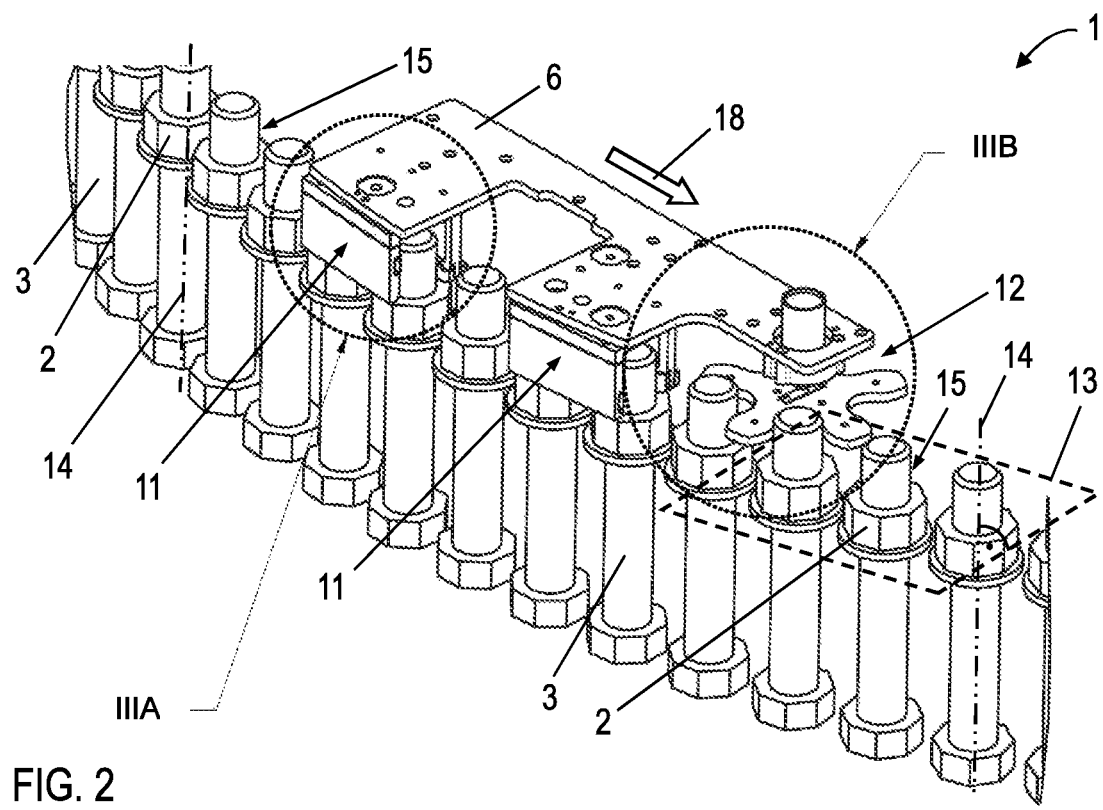
FIG. 2 shows in a perspective view the robot according to a second embodiment of the invention.
Figure 7:
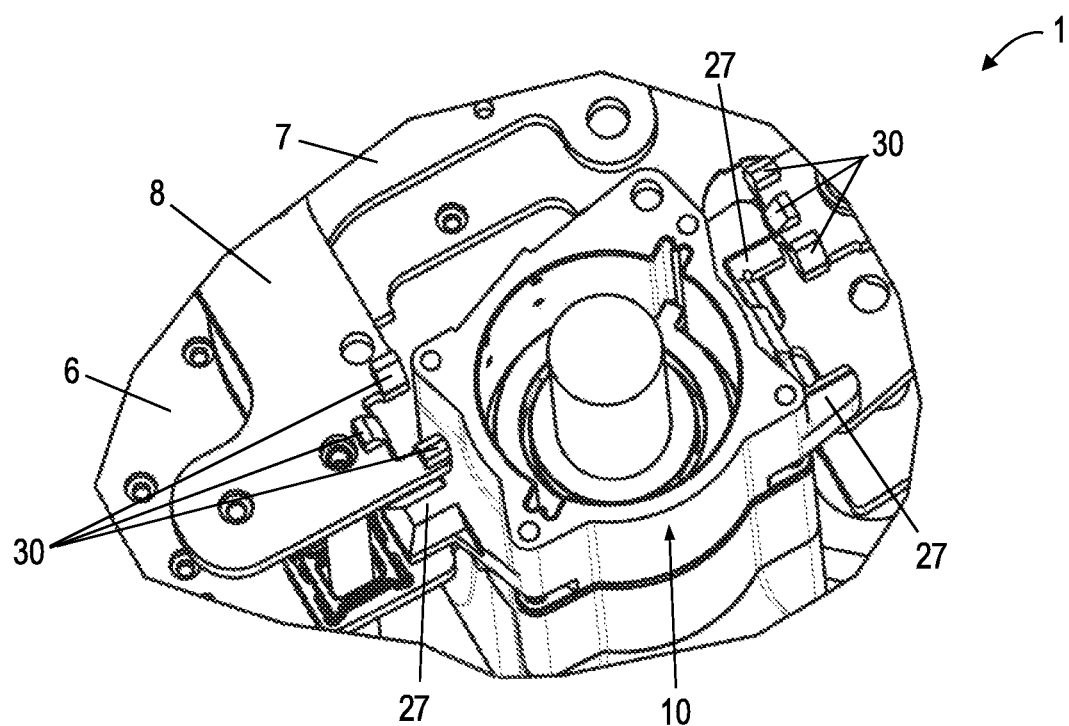
FIG. 7 shows detail VII of FIG. 6.
Figure 8:
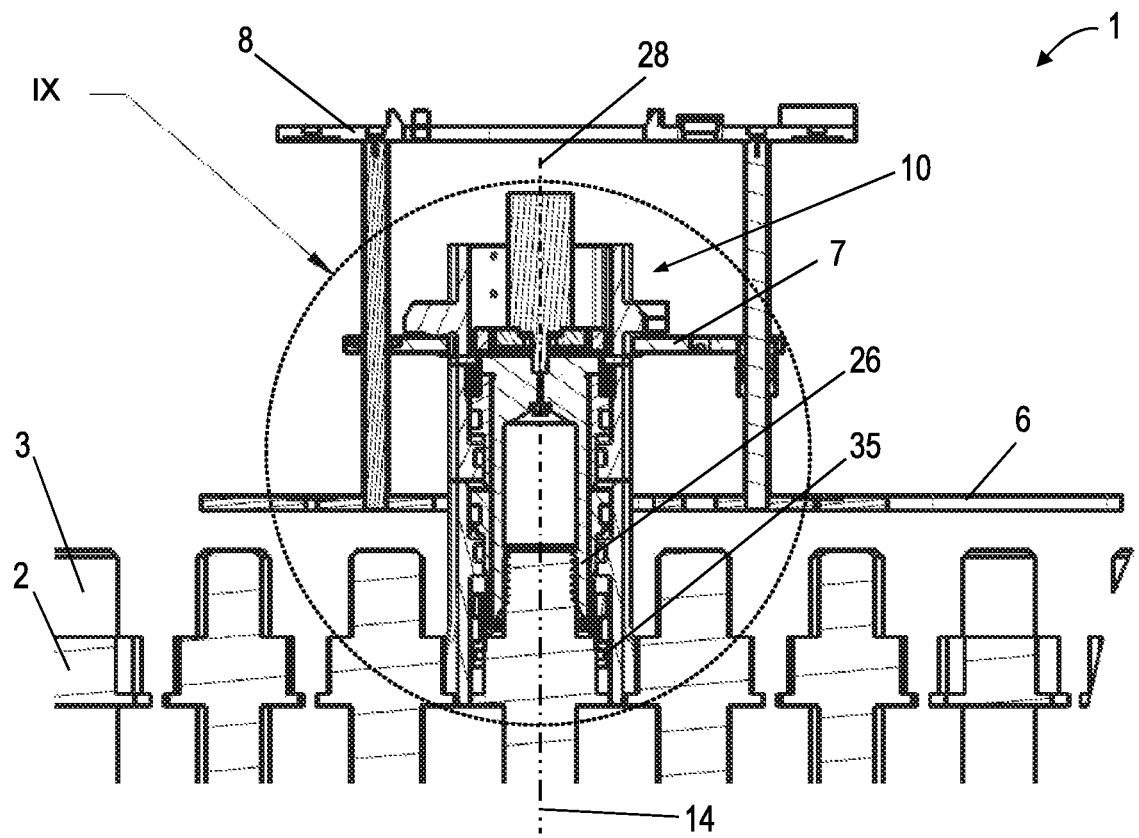
FIG. 8 shows in a cross section parallel to a bolt axis the robot of FIG. 6.
Figure 9:
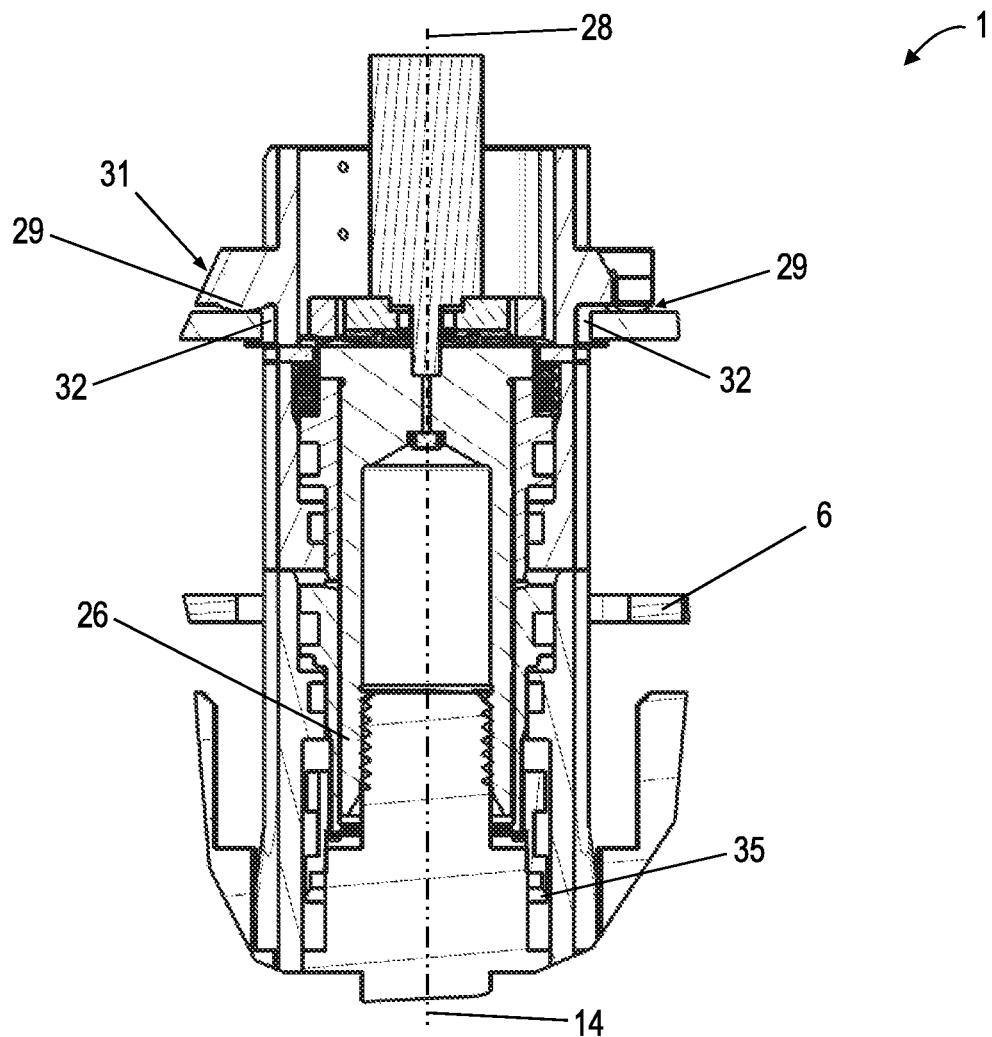
FIG. 9 shows detail IX of FIG. 8.
Figure 10:
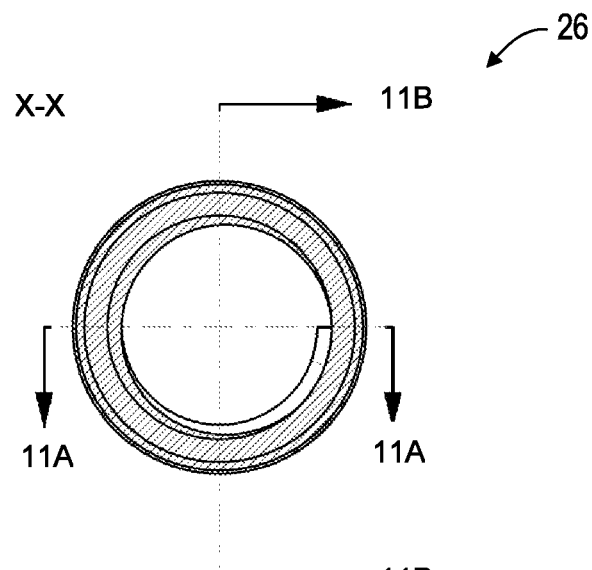
FIG. 10 shows in a cross section along X-X (FIG. 11B) a tension nut.

FIG. 2 shows the robot 1 according to a second embodiment of the invention. For clarity reasons the curved flange connection 4 is not shown. In this embodiment robot 1 comprises the support platform 6 and the drive. The drive comprises holding means 11, shown in more detail in FIG. 3A, and a drive element 12, shown in more detail in FIG. 3B. In addition, FIG. 4 shows in a top view a section parallel to a nut plane 13. Nut plane 13 is substantially perpendicular to bolt axes 14. In FIG. 4 the nut plane 13 coincidences with the image plane. Nuts 2 are pre-screwed in substantially the nut plane 13 and the bolts 3 project from the nuts 2 by a projection length 15. Substantially in the nut plane 13 means that there is a particular tolerance that allows some or the nuts 2 to be pre-screwed onto the bolts 3 a bit more than others.

In the second embodiment holding means 11 of robot 1 comprise two pairs of guiding rails 16 and 17, both connected to the support platform 6 and spaced apart from each other. In principle robot 1 works with any number of pairs of guiding rails 16 and 17. At each pair of guiding rails 16, 17 an inner guiding rail 16 and an outer guiding rail 17 are connected to the support platform 6 in a distance from each other of more than the diameter D of the bolts 3 and less than the width across flat AF of the nuts 2 and they project downwards, substantially parallel to the axes 14 of the bolts 3, more than the projection length 15 from the support platform 6. Hereby, the outer guiding rail 17 is in a radial direction 21 situated further away from a center of the curved flange connection 4 as the inner guiding rail 16. The inner guiding rail 16 holds the robot 1 against forces in the radial direction 21 and the outer guiding rail 17 holds the robot against forces against the radial direction 21. Consequently, the holding means 11 hold the robot 1 on a cover surface 22 of the nuts 2 and ensure that platform 6 does not touch the bolts 3. This enables a save movement of robot 1 along the curved flange connection 4 without much friction.

To better guide robot 1 along the curved flange connection 4 guiding rails 16 and 17 may be tiltable connected to the support platform 6 in order to tilt them around an axis A essentially parallel to the axes 14 of the bolts 3. In addition, the inner guiding rail 16 and the outer guiding rail 17 according to the second embodiment of the invention comprise inner safety means 23 and outer safety means 24 in order to secure robot 1 from falling or tilting. Falling or tilting may appear if the resulting center of gravity M of robot 1 creates a to big turning moment.

In order to improve the structural stability of the guiding rails 16 and 17, holding means 11 may be realized as inversely U-shaped guiding brackets, which are tiltable connected to the support platform 6. Such inversely U-shaped guiding brackets are shown in FIGS. 5A and 5B. The inversely U-shaped guiding brackets may be assumed to be formed from three legs, whereas an inner leg forms the inner guiding rail 16 and an outer leg forms the outer guiding rail 17 and whereas the inner leg and the outer leg are connected by a connection leg 25. The inner leg and the outer leg have an inner length greater than the projection length 15, and the connecting leg 25 has an inner length greater than the diameter D of the bolts 3 and an outer length less than the width across flat AF of the nuts 2. FIG. 5A shows the inversely U-shaped guiding bracket in a first embodiment, whereas the center of gravity M acts along an axis that in the radial direction 21 is situated closer to the center of the curved flange connection 4 as the axes 14 of the bolts 3. This enables to realize holing means 11 with outer guiding rail 17 shorter than inner guiding rail 16 what may help to ease the process to tighten nuts 3. FIG. 5B shows the inversely U-shaped guiding bracket in a second embodiment, whereas the center of gravity M acts along an axis that in the radial direction 21 is situated nearby or at the same distance to the center of the curved flange connection 4 as the axes 14 of the bolts 3.

Advantageously, drive element 12 is mounted at the support platform 6 before the holding means 11 along a primary drive direction 18 of the robot 1. Alternatively, the drive element 12 may be mounted at the support platform 6 after or in-between the holding means 11 along the primary drive direction 18. The drive element 12 comprises a motor, not shown in the figures, built to drive engage means that engage into a space between neighboring bolts 3 of the curved flange connection 4. The engage means advantageously comprise a star-shaped radial plate 20, which may comprise at least two, preferably five, arms that gear in-between the space between neighboring bolts 3 in the radial direction 21 of the curved flange connection 4. By engagement of the arms and simultaneous rotation of the radial plate 20 the support platform 6, and consequently the robot 1, is pulled by the drive element 12 and guided by the holding means 11 in order to move along the curved flange connection 4.

The drive element 12 according to the invention may be realized in different ways. For example the engage means may engage at the curved flange connection 4 by adhesion, friction or other physical and/or chemical forces or mechanisms. The motor may be an electric or pneumatic or hydraulic motor that directly transmits its rotation to the engage means or that transmits its rotation by gears, belts or similar elements. The holding means 11 may move the robot 1 without the drive element 12, for example by a clamp-and-release mechanism of each pair of guiding rails 16, 17.

FIGS. 6 to 9 show the robot 1 according to a third embodiment of the invention. The robot 1 comprises the support platform 6, the movable mounting platform 7, the top plate 8, which mounting platform 7 is supported by the support platform 6, and the tool 10. For clarity reasons the drive and the curved flange connection 4 are being omitted. The tool 10 comprises a tension nut 26 and a tightening wheel 35. The robot 1 comprises positioning means to substantially align the axis 28 of the tension nut 26 with the axes 14 of the bolts 3 to screw the tension 26 nut onto the bolts 3.

In the third embodiment of the invention positioning means of the robot 1 comprise three connection means 27, which are attached to the tool 10. By these connection means 27 the tool 10 is pin-ended on the movable mounting platform 7, whereas rotation within the plane of the mounting platform 7 is prohibited due to this threefold bearing. The connection means 27 comprise a rounded element 29 which acts as the pin of the pin-ended bearing and enables tipping of the tool 10 to align the axis 28 of the tension nut 26 with the axis 14 of the bolt 3 while the tool 10 is lowered and the tension 26 nut is screwed onto the bolt 3.

Since the movable mounting platform 7 is movable substantially along the axis 28 of the tension nut 26, also the tool 10 is movable substantially along this axis 28. The movable mounting platform 7 may be moved by two axial ball bushings on a rod mounted on the support platform 6, and it may be actuated by using a spindle driven by an electric motor, not shown in the figures. The movable mounting platform 7 can be moved to an upmost resting position. The movable mounting platform 7 is moved into the resting position during the movement of the robot 1 along the curved flange connection 4 and/or if the tool 10 is realigned. The top plate 8 comprises locking means 30 to lock the tool 10 in the resting position. In addition, the connection means 27 comprise an angled surface 31 that interacts with the locking means 30 in order to force the tool 10 into a zero position. Hence, the zero position realigns the tool 10 and is automatically taken as soon as the movable mounting platform 7 is in its resting position. This allows the tool 10 to self-align to the bolts 3 without straining the robot 1 and loosening accuracy demands.

As soon as the movable mounting platform 7 is moved out of the resting position, the tool 10 is able to tip. Hence, by lowering the tool 10 onto the bolt 3, the axis 28 of the tension nut 26 is able to align with the axis 14 of the bolt 3. The connection means 27 may comprise securing means 32 in order to confine the tipping of the tool 10 and prevent the tool 10 from excessive tilting, rotating or from falling off the robot 1. The securing means 32 may have a female-female or a male-male interface between the tool 10 and the mounting platform 7.

The positioning means may additionally comprise one or all of the following four features of the tension nut 26 helping to precisely align the axis 28 of the tension nut 26 to the axis 14 of the bolt 3 when lowering the tool 10 onto the bolt 3 as shown in FIGS. 10 to 12B:
1) An angled surface section 33 as introductory part before the turns of thread 34 on the tension nut 26 start.
2) A first turn of the thread 34 of the tension nut 26 that is formed to ease the insertion of the thread of the bolt 3, wherein the first turn of the thread 34 of the tension nut 26 compared with a standard metric thread comprises a larger chamfer with a steep angle W to ease the insertion of the thread of the bolt 3 as shown in FIG. 12A.
3) The first one or two turns of the thread 34 of the tension nut 26 that compared with the full cross section $C_F$ of a standard metric thread have a reduced cross section $C_R$ by a parallel offset of one of the walls of the thread 34 to create more clearance as shown in FIG. 12B. Gravity ensures that always the lower side of the thread 34 is in contact with the bolt 3, and that there is no notable contact on the upper side of the thread 34. After the first one or two turns of the thread 34 the full cross section of the thread 34 is being obtained by a slow transition at the upper side of the thread 34. Hereby, there is no noticeable transition between reduced cross section $C_R$ and the full cross section $C_F$.
4) The first turn of the thread 34 of the tension nut 26 compared with a standard metric thread that is built in a way to avoid forces onto the first turn of the thread 34 along the axis 28 of the tension nut 26 during elongation of the bolt 3 after more than two turns have been screwed onto the bolt 3. Hereby, a possible deformation of the first turn of the thread 34 is prohibited, improving the possibility of thread engagement between the tension nut 26 and the bolt 3.

A robot 1 according to the first embodiment and the third embodiment of the invention is suited to automatically tighten a series of nuts 2 pre-screwed on bolts 3 arranged in a curved flange connection 4. Such a method may be characterized in that the following steps are processed:
1) After the robot 1 is positioned on the curved flange connection 4 the robot 1 itself positions the tool 10 in a way to substantially align the axis 28 of the tension nut 26 of the tool 10 with the axis 14 of the bolt 3. This first coarse positioning of the tool 10 may be done by a position sensor or by a software routine, whereas the robot 1 is moved along the curved flange connection 4 by the drive. Subsequently, the fine positioning of the tool 10 is done by the positioning means as described before.

2) The tool 10 screws the tension nut 26 onto only a part or all of the thread of the projection length 15 of the bolt 3, wherein the axis 28 of the tension nut 26 is tipped in order to match with the thread of the projection length 15 of the bolt 3. The rotation of the tension nut 26 may be done by a motor.

3) The tool 10 pulls the bolt 3 along the axis 28 of the tension nut 26. This causes a stretching and physical elongation of the bolt 3, in practice for example in excess of 2 mm. This stretching causes the bolt 3 to lift off of the curved flange connection 4. For pulling the bolt 3 a hydraulic device may be used, wherein hydraulic oil from a small pump acts upon a piston connected to the tension nut 26. Thus, the stretching or physical elongation in the bolt 3 is effectively controlled by hydraulic pressure, if the tension is proportional to the hydraulic pressure.

4) The corresponding nut 2, which is simultaneously lifted of the curved flange connection 4 with the bolt 3, is rotated and tightened by the tightening wheel 35 until it again has contact with the curved flange connection 4 and a predefined torque is achieved. The tightening wheel 35 may be rotated by gears driven by a motor.

As soon as the pull on the bolt 3 is relaxed, the bolt 3 carries the same load as the tool 10 previously exerted on the bolt 3 and the physical elongation and tension remains. The robot 1 may now be moved to the next bolt 3.

The robot 1 works similar, if the nuts 2 are to be loosened. In this case, the nut 2 is turned by the tightening wheel 35 away from the curved flange connection 4 by a controlled amount that is larger than the physical elongation of the bolt 3.

The term tighten or tightening in the claims and description should be understood to cover the meaning of the terms bolt down or torqueing or preload or pre-stress or screw down.

The robot 1 according to the invention may also carry a tool comprising a bolt tightening tool, torque wrench, a robot control system, a camera, a position sensor, measuring instrument, or combinations thereof. Thereby, robot 1 may also be used for inspection or service purposes. Robot 1 may be used for any kind of flange connection in any kind of technical building, machines, facility, plant or any similar structure. Robot 1 for instance could be used to flange connections of tube segments of oil platforms, pipelines, wind turbines, windmills, or towers used as antenna mast or look-out.

A robot according to a further embodiment of the invention could be adopted to move a support platform along a series of nuts arranged in a linear flange connection or a rectangular flange connection. This has the advantage that nuts of a linear flange connection to e.g. mount a large motor to concrete in the ground could be tightened by the robot.

The term "nut" does not only include elements as standardized with an internal screw thread and a hexagonal outer surface, but does include any element with an internal screw thread and an outer surface of any form. This includes for instance an element with an internal screw thread and a cylindrical outer surface. The tightening wheel could for instance comprise a rubber surface to tighten the pre-screwed nut with the cylindrical outer surface with a predefined torque. The term "bolt" also includes elements that only for part of their length comprise an external thread to enable the tightening of the nuts. Such a bolt could also be a step shaped cylindrical shaft with a threaded end.

The mast of a wind turbine may have elements of conical shape with a diameter that reduces the higher the mast gets. In this case walls 5 would be slightly inclined towards the center and bolt axes 14 would be slightly inclined as well. As a result the nut plane would still be substantially perpendicular to bolt axes 14 close by, but not a complete flat plane.

The invention claimed is:

1. A robot to tighten a series of nuts pre-screwed on bolts arranged in a curved flange connection, wherein the bolts project from the nuts pre-screwed in substantially a nut plane by a projection length, wherein the robot comprises:
   a drive to move the robot along the curved flange connection,
   a tool to tighten the nuts with a predefined torque both connected to a support platform, wherein the tool is built to screw a tension nut onto the bolt to elongate the bolt and to tighten the pre-screwed nut with a predefined torque, the tool being pin-ended by connection means on a movable mounting platform supported by the support platform and movable substantially along the axis of the tension nut, which connection means comprise at least one rounded element to enable tipping of the tool to align the axis of the tension nut with the axis of the bolt, and
   positioning means to substantially align an axis of the tension nut with an axis of the bolt during lowering of the tool onto the bolt, in order to screw the tension nut onto the bolt, through mechanical engagement of at least one of (i) the tension nut with the bolt, and (ii) the connection means with the movable platform.

2. The robot according to claim 1, wherein at least the first turn of a thread of the tension nut is formed to ease the insertion of the thread of the bolt.

3. The robot according to claim 2, wherein a first turn of the thread of the tension nut compared with a standard metric thread comprises a larger chamfer with a steep angle to ease the insertion of the thread of the bolt.

4. The robot according to claim 2, wherein at least the first turn of the thread of the tension nut compared with a standard metric thread comprises a reduced cross section by a parallel offset of one of the walls of the thread to create more clearance.

5. The robot according to claim 2, wherein at least the first turn of the thread of the tension nut compared with a standard metric thread is built in a way to avoid forces onto the first turn of the thread along the axis of the tension nut during elongation of the bolt after more than two turns have been screwed onto the bolt.

6. The robot according to claim 1, wherein the support platform supports a top plate with locking means to lock the tool in a resting position of the movable mounting platform.

7. The robot according to claim 6, wherein the connection means comprise at least one angled surface built to interact with the locking means and to force the tool into a zero position, wherein the movable mounting platform is in the resting position.

8. The robot according to claim 1, wherein the connection means comprise securing means in order to confine the tipping of the tool.

9. A system of a curved flange connection and a robot to tighten a series of nuts pre-screwed on bolts arranged in a curved flange connection, wherein the bolts project from the nuts pre-screwed in substantially a nut plane by a projection length, wherein the robot comprises a drive to move the robot along the curved flange connection and a tool to tighten the nuts with a predefined torque both connected to a support platform, wherein the robot comprises the elements as claimed in claim 1.

* * * * *